United States Patent
Meyer et al.

(10) Patent No.: US 8,100,373 B2
(45) Date of Patent: Jan. 24, 2012

(54) DIGITAL PROJECTOR MOUNT

(76) Inventors: Christopher E. Meyer, Fountain Valley, CA (US); John W. Waguespack, Redondo Beach, CA (US)

(*) Notice: Subject to any disclaimer, the term of this patent is extended or adjusted under 35 U.S.C. 154(b) by 584 days.

(21) Appl. No.: 12/262,150

(22) Filed: Oct. 30, 2008

(65) Prior Publication Data

US 2009/0114786 A1 May 7, 2009

Related U.S. Application Data

(60) Provisional application No. 61/001,489, filed on Nov. 1, 2007.

(51) Int. Cl.
*E04G 3/00* (2006.01)

(52) U.S. Cl. .............................. 248/278.1; 248/288.31

(58) Field of Classification Search ............... 248/274.1, 248/278.1, 282.1, 284.1, 289.11, 291.1, 288.31, 248/288.11; 211/193, 90.01, 90.02
See application file for complete search history.

(56) References Cited

U.S. PATENT DOCUMENTS

| | | | | | |
|---|---|---|---|---|---|
| 4,549,727 | A | * | 10/1985 | Kozar | 269/70 |
| 5,853,158 | A | * | 12/1998 | Riggle | 248/311.2 |
| 5,988,572 | A | * | 11/1999 | Chivallier et al. | 248/176.1 |
| 6,478,275 | B1 | * | 11/2002 | Huang | 248/284.1 |
| 6,540,199 | B2 | * | 4/2003 | Hung et al. | 248/694 |
| 2008/0105807 | A1 | * | 5/2008 | Oh | 248/278.1 |
| 2009/0008524 | A1 | * | 1/2009 | Huang et al. | 248/278.1 |
| 2009/0090831 | A1 | * | 4/2009 | Henning et al. | 248/278.1 |

OTHER PUBLICATIONS

Secure-It, Inc., "Sonic Shock Alarm 3 SONC-SSA," <http://www.secure-it.com/shop/product_info.php/products_id/43?osCsid=7c5d0a5> last visited on Oct. 30, 2008.

Secure-It, Inc., "Sonic 3/4 Mounting Plate SONC-SSAPLTE3," <http://www.secure-it.com/shop/product_info.php/products_id/228> last visited on Oct. 30, 2008.

Business Machine Security—Locdown.com, "Projector Cart Lock Kit" <http://www.locdown.com/projector-cart-lock-kit.htm> last visited on Oct. 30, 2008.

Business Machine Security—Locdown.com, "Side Loc Cable Nut Kit" (LCD-SL-CN) <http://www.locdown.com/ projector-mounts.htm> last visited on Oct. 30, 2008.

Business Machine Security—Locdown.com, "Media Cart Loc" <http://www.locdown.com/media-cart-loc.htm> last visited on Oct. 30, 2008.

Business Machine Security—Locdown.com, "LCD Projector Security Anti-Theft Mount" <http://www.locdown.com/projector-ceiling-mount.htm> last visited on Oct. 30, 2008.

INCO Computer & AV Security, "LCD Projector Security Cages" <http://www.inco-security.co.uk/lcd-projector-security-cages/> last visited on Oct. 30, 2008.

INCO Computer & AV Security, "Secure Low Cost Universal Projector Mount" <http://www.inco-security.co.uk/projector-security-mount/> last visited on Oct. 30, 2008.

(Continued)

*Primary Examiner* — Ramon Ramirez

(57) ABSTRACT

A projector mount securely mounts a projector or other presentation device to a computer workstand. The projector mount comprises a security plate and a projector bracket or projector arm. The projector bracket or arm is connected to the security plate by a hinge or ball pivot to provide vertical and horizontal tilting as well as pivoting capability of the projector or presentation device. A digital presenter mount comprises a vertical plate, a horizontal plate, a security holder bracket, and a locking bracket. The horizontal plate attaches to the vertical plate. The security holder bracket is inserted through slots formed in the horizontal plate and in the locking bracket to prevent theft of the presentation device.

18 Claims, 9 Drawing Sheets

OTHER PUBLICATIONS

INCO Computer & AV Security, "LPCB Approved Projector Security Cages" <http://www.inco-security.co.uk/slim-line-projector-security-cages/> last visited on Oct. 30, 2008.

Canadian Business Machines, "UPRO-1—Universal Projector Mount" <http://www.cbmmetal.com/cataloguePages.cfm?product_id=119&ser_id=50&cat_id=3> last visited on Oct. 30, 2008.

Aztec Security Products/Coverpro, "Hold-It LCD Security Kit" <http://www.aztec-coverpro.com/shop.net/productdetails.asp?catid=17&prodid=359> last visited on Oct. 30, 2008.

a2z Mobile Office Solutions, Inc.,a2z Laptop SecureLocDown <http://www.a2zsolutions.com/computer/security/secure_locdown.htm> last visited on Oct. 30, 2008.

* cited by examiner

DIGITAL PROJECTOR MOUNT

CROSS-REFERENCE TO RELATED APPLICATIONS

This application claims priority to U.S. Provisional Application No. 61/001,489 filed Nov. 1, 2007, the entire contents being incorporated by reference herein. This application also incorporates by reference the entire contents of U.S. Provisional Application No. 60/815,087 filed Jun. 20, 2006, U.S. application Ser. No. 11/820,687 entitled LAPTOP SECURITY DEVICE FOR TECHNOLOGY WORKSTAND filed on Jun. 20, 2007, U.S. Provisional Application No. 60/815,088 filed Jun. 20, 2006, and U.S. application Ser. No. 11/820,638 entitled SECURE SHELF FOR TECHNOLOGY WORKSTAND filed on Jun. 20, 2007.

STATEMENT RE: FEDERALLY SPONSORED RESEARCH/DEVELOPMENT (Not Applicable)

FIELD

The present invention relates generally to a presentation cart, and, more particularly, to a projector mount specifically adapted to secure a LCD projector and digital presentation device to a support or stand, such as a computer workstand to prevent theft thereof.

BACKGROUND

Projectors and digital presentation devices are used in a wide variety of industries and in various settings and applications. Such settings may include conference room presentations, classroom lectures, and various training applications. Due to the relatively high cost of such devices, financial loss due to theft is of special concern for entities such as corporations, government agencies and educational institutions that purchase large quantities of these devices. Thus, it is of primary importance for such entities to address theft prevention prior to making LCD projectors and digital presentation devices available to employees, students and others who may use these devices in public and semi-public areas.

Traditional presentation or audio-visual (AV) carts accommodate LCD projectors and various digital presentation devices but lack a security system to protect the devices from theft. In order to reduce losses from theft, various security solutions are available from manufacturers of security products. Although some of the security solutions may have a primary objective of theft protection, they possess certain deficiencies which fail to protect against theft but still allowing for mobility of the presentation devices. Furthermore, many security solutions are unable to secure a variety of different types of presentation devices. In addition, many security solutions require permanent attachment of the presentation devices to a plate or other object in order to prevent theft.

Another deficiency associated with conventional anti-theft devices such as projector locks is the lack of portability of the presentation device in moving the device from one room to another. For example, certain projector locks include a cable which must be looped around a stationary object to prevent theft. Thus, transporting the presentation device from one room to another requires first unlocking the lock to remove the cable from the stationary object in one room, moving the presentation device to another room and then re-locking the lock after looping the cable around a stationary object in the room. Other lock arrangements include alarms that may be connected to a stationary base using a tether. The alarm is triggered if the tether is cut or unplugged. Moving the presentation device from one room to another room typically requires a key to disarm the alarm and a stationary base in the other room in which to plug the tether.

Perhaps the greatest deficiency associated with conventional anti-theft projector locks is the lack of adjustability of the presentation device to provide for optimal usability. In particular, many security solutions restrict horizontal and/or vertical adjustment of the presentation device which may be desirable when the presentation device is used in different settings where the projector screen may be at different heights, for example. Furthermore, may security solutions for preventing theft of presentation devices lack a swivel capability to further increase the directional adjustability of the presentation device. By restricting adjustment of the presentation device, the projector locks greatly limit the settings and locations in which the presentation devices may be used.

In view of the above-described shortcomings of conventional security solutions, there exists a need in the art for a projector mount that secures a projector or other digital presentation device to a support in an effective manner. More specifically, there exists a need in the art for a projector mount that can effectively secure a projector or other digital presentation device to a support and which further provides the capability of protecting the device against theft while allowing for vertical and/or horizontal tilt and swivel capability of the presentation device. Even further, there exists a need in the art for a projector mount that effectively secures a projector or other digital presentation device to a support but which is adapted to mount a variety of different audio/visual devices such as pen tablets and electronic document cameras on a single workstand in modular fashion.

BRIEF SUMMARY

The above-described deficiencies associated with projector mounts of the prior art are specifically addressed and alleviated by the present disclosure which provides a mount that attaches to a stationary or portable support or stand for secured mounting of a variety of different sizes and configurations of projectors or other digital presentation devices.

The mount may comprise a projector mount that may include a bracket or hinge connecting a projector arm to a security plate which allows for vertical and/or horizontal tilt of the presentation device as well as swivel capability. The security plate may include holes and/or slots of various lengths which are oriented to allow for secure mounting of various sizes and configurations of presentation devices to the security plate. The slots may be aligned in a perpendicular or parallel relationship with each other although a variety of alternative orientations of the slots are contemplated.

The presentation device may be mounted to the security plate with security screws or fasteners that enter through a bottom of the security plate and thread into threaded inserts disposed on a bottom of the presentation device. The security screws may be conventional threaded fasteners such as conventional screws or bolts although any type of mechanical fasteners may be used. Once inserted, the screws securely attach the presentation device to the security plate.

The security plate may be secured to a projector arm and/or hinges. The bracket or hinge may be configured to allow for vertical and/or horizontal tilt and swiveling of the security plate and the attached presentation device. The projector arm may be configured to be attached to a back wall of a support assembly by inserting outwardly extending tabs or studs located on the projector arm. The tabs or studs may be extended into preformed slots or holes formed on a back wall of the support assembly. The projector arm may also be configured to be attached to a side wall of the support assembly by extending the tabs or studs through slots or holes. Once in place, threaded collars or conventional threaded nuts may be used to secure the projector arm to the support assembly.

The mount may also comprise a digital presenter mount such as for a document camera. The digital presenter mount may include a horizontal and vertical plate to support the digital presenter as well as a security holder tab and a locking tab to secure the digital presenter to the horizontal plate. The horizontal plate may be disposed on an outwardly extending lip of the vertical plate. The horizontal plate may attach to the vertical plate and the support assembly using mechanical fasteners.

The security holder bracket extends around a portion of the digital presenter and passes through aligned slots in the horizontal plate and the locking bracket. In this manner, the digital presenter cannot be removed without first removing the security holder bracket. The locking bracket may be moved slightly horizontally to engage notches formed in the security holder bracket. The locking bracket may be secured in place using a locking mechanism such as a pad lock or combination lock or any other suitable locking mechanism wherein a shaft of the locking mechanism may pass through a hole formed in the locking bracket and a hole formed in the support assembly tab and/or the support panel tab.

A modular arm assembly may be mounted to a side or back of the support assembly for mounting a variety of devices such as a pen tablet to allow a user to draw images that may be projected by a projector and/or which may be captured by a computer such as the laptop support on the support stand. The modular arm assembly may include clamp knobs that facilitate positioning of the pen tablet or other device in a variety of different orientations to which the pen tablet may be fixed by locking of the clamp knobs which may be disposed at lower and upper ends of the arm assembly.

The support assembly may include at least one drawer which may slide into and out of the support assembly. The drawer may also include a keyboard tray. An optional mouse tray may be laterally outwardly slidable from the keyboard tray. The support assembly may also include a support panel located above the drawer and which may be sized and configured to support a laptop computer. The support panel provides a top to an interior of the support assembly within which various items may be stored. The support panel may slide along the top of the support assembly and may be secured in place by inserting a locking mechanism, such as a pad lock, through axially aligned holes in the tabs of the support panel and support assembly.

The support panel may include various preformed slots and/or holes to allow for attachment of security devices for securing the laptop computer to the support panel. The security may be mounted to the support panel with mechanical fasteners that may extend through a bottom of the support panel and may thread into the security devices. The security devices may include two outwardly extending prongs which secure the laptop computer when the laptop computer is in an open position (i.e., when the display monitor of the laptop computer is pivoted relative to the laptop keyboard).

The support assembly may be mounted atop a pedestal. The pedestal preferably comprises a piston, as well as a post having a telescopic mechanism, to provide for height adjustment of the support assembly. The pedestal may further include a base assembly having a plurality of radially outwardly extending spokes which each have a castor or wheel on a free end.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
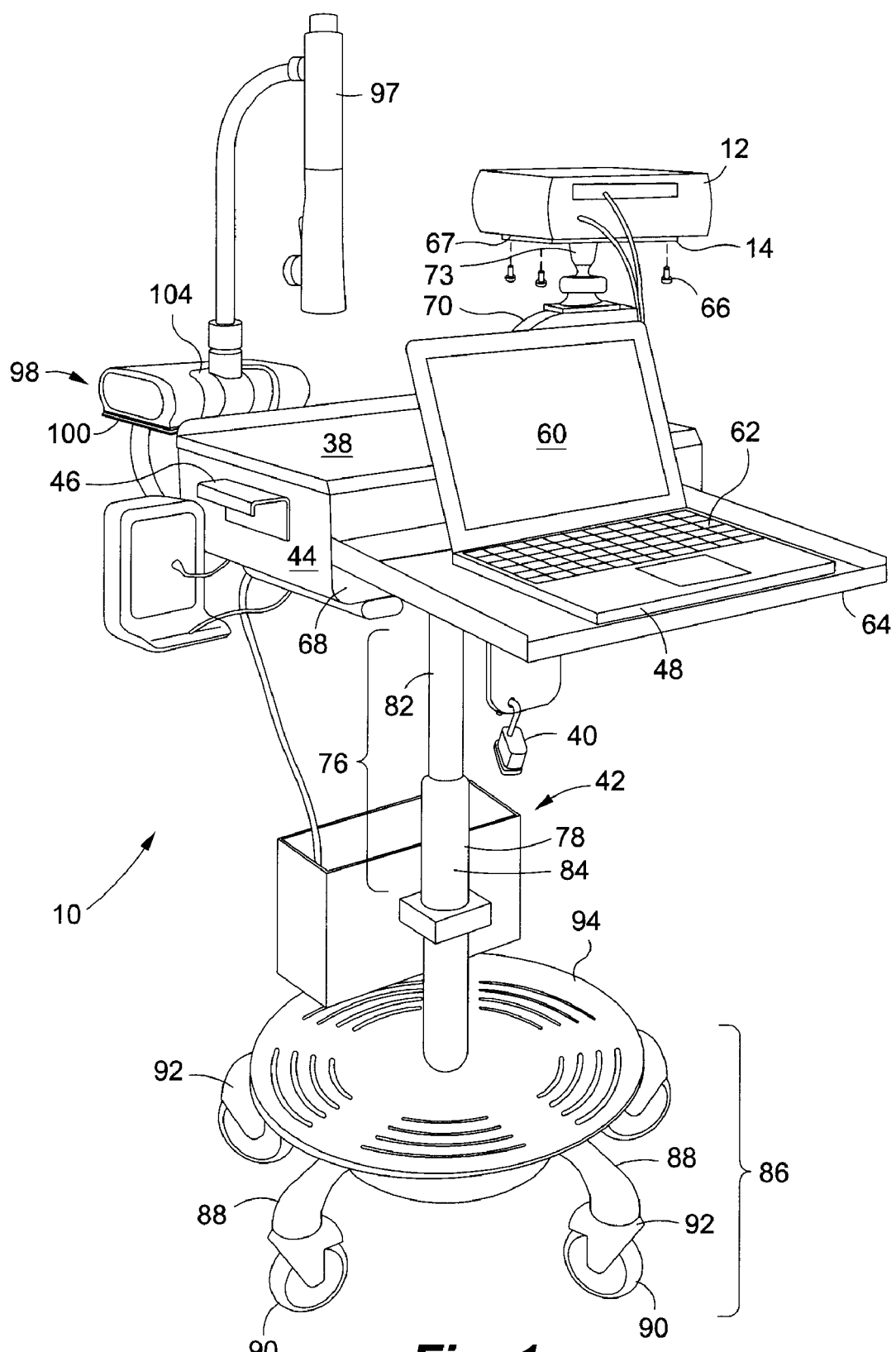
FIG. 1 is a forward perspective view of a portable computer workstand illustrating a presentation device and a digital projector such as a document camera mounted on a support assembly.

These and other features of the present disclosure will become apparent upon reference to drawings wherein FIGS. 1-9 illustrate a computer workstand 10 specifically adapted to securely mount and transport a digital projector and other presentation devices 12 such as document cameras and graphic tablets or pen tablets. The computer workstand 10 may include a projector mount 11 comprising a multi-slotted security plate 14 hingedly mounted to a projector bracket 16 or to a projector arm 70 in such a manner as to prevent theft of the presentation device 12 while allowing a wide range of tilt and swivel adjustability.

Figure 2:
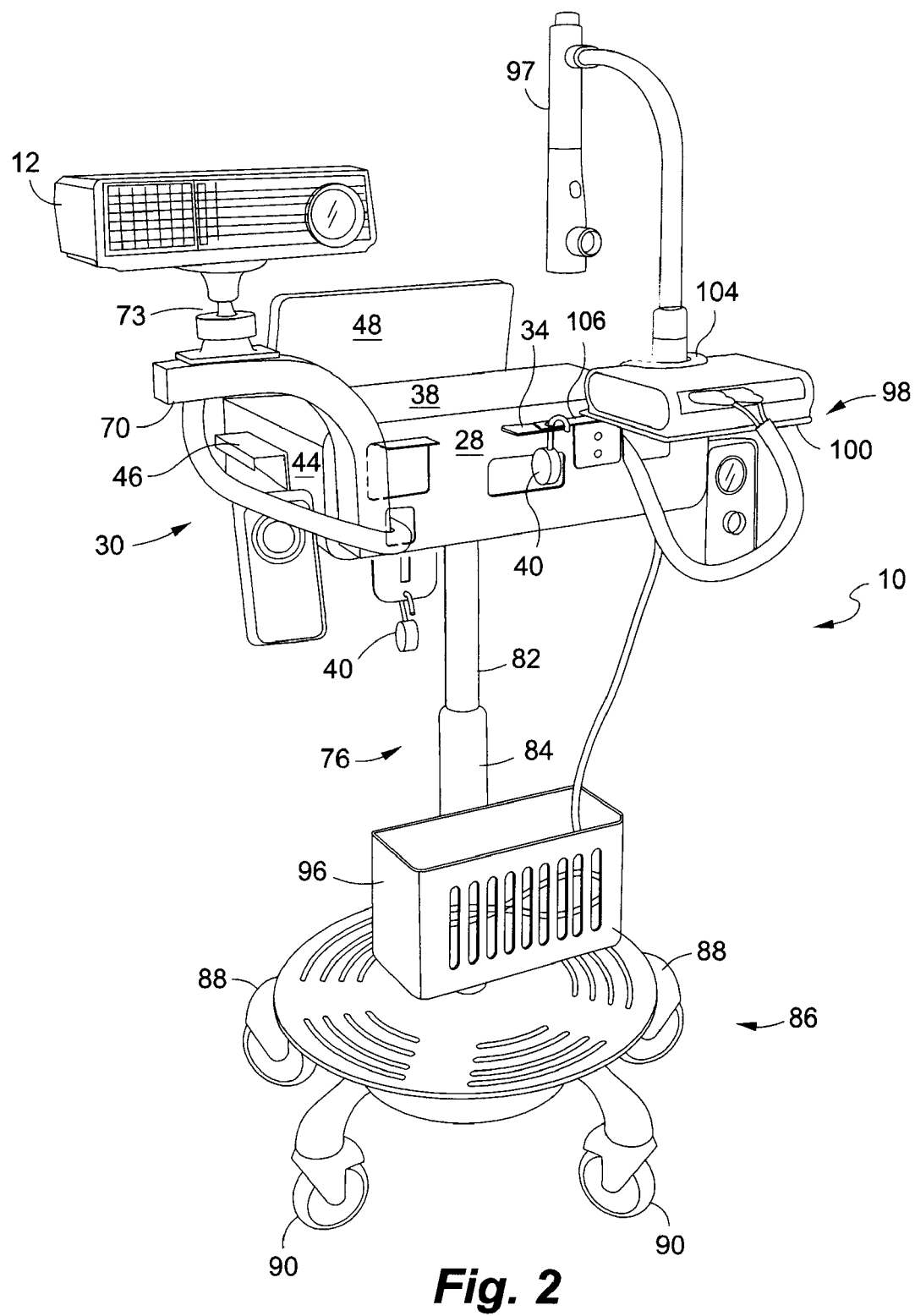
FIG. 2 is an aft perspective view of the portable computer workstand illustrating a projector arm to which the presentation device may be mounted.
Figure 3:
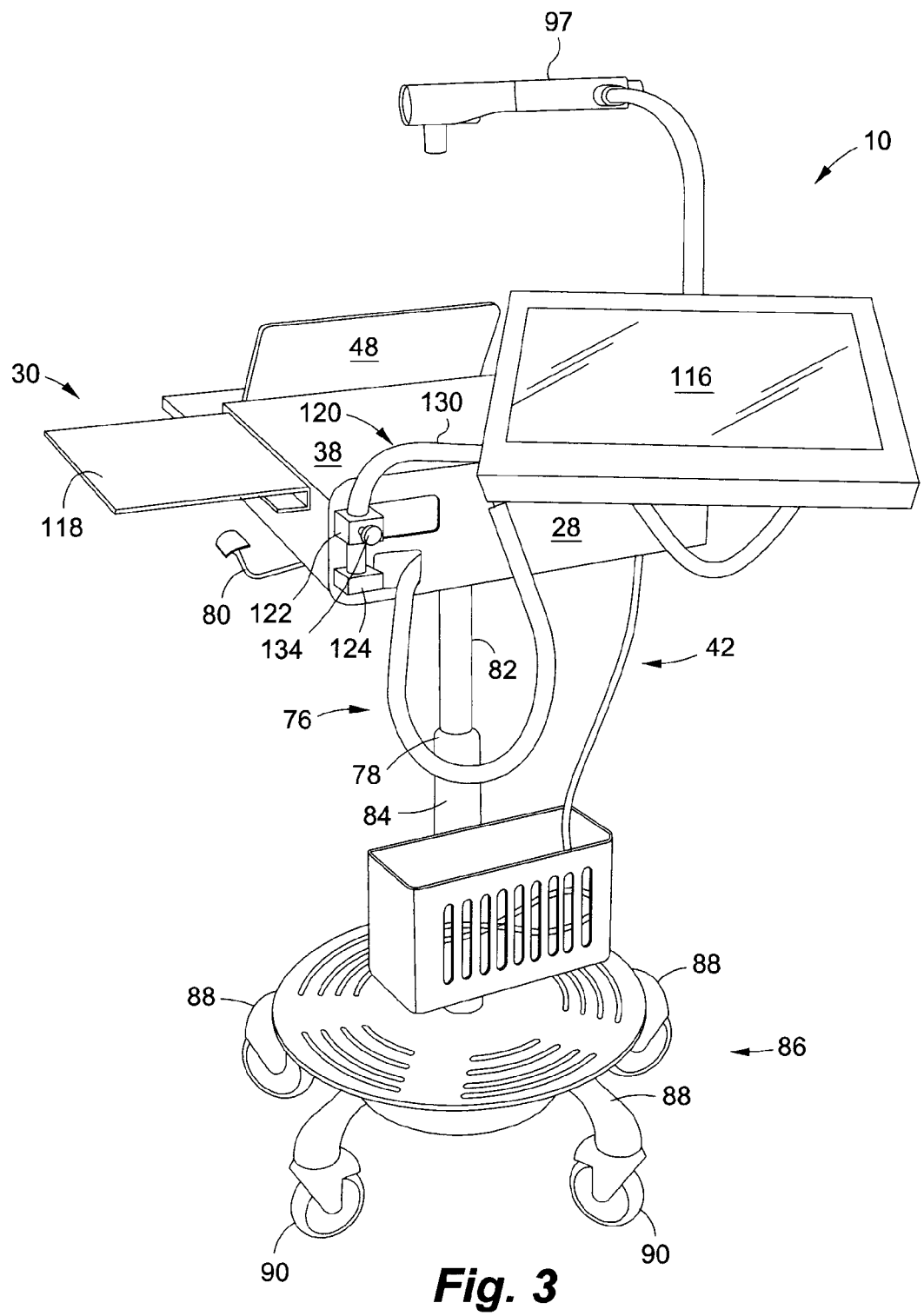
FIG. 3 is an aft perspective view of the portable computer workstand in a further embodiment illustrating a pen tablet mounted on a modular arm.

As shown in FIGS. 1-3, the computer workstand 10 may include a digital presenter mount 98 configured to securely mount a digital presenter 97 such as a document camera to the computer workstand 10 without the need to mechanically fasten the digital presenter 97 to the computer workstand 10. In this regard, the digital presenter mount 98 facilitates the clamping of the digital presenter 97 to the digital presenter mount 98 in a secure, convenient and theft-resistant manner. As will be described in greater detail below, the digital presenter mount 98 may be secured to the computer workstand 10 by at least one lock mechanism such as a padlock or combination lock.

The computer workstand 10, support assembly 30 and related components disclosed herein may be configured similar to that which are disclosed in U.S. Provisional Application No. 60/815,088, filed Jun. 20, 2006, U.S. application Ser. No. 11/820,638 entitled SECURE SHELF FOR TECHNOLOGY WORKSTAND filed on Jun. 20, 2007, U.S. Provisional Application No. 60/815,087 filed Jun. 20, 2006, U.S. application Ser. No. 11/820,687 entitled LAPTOP SECURITY DEVICE FOR TECHNOLOGY WORKSTAND filed on Jun. 20, 2007, the entire contents of each application being incorporated by reference herein.

Referring to FIGS. 1-4, shown are perspective views of the computer workstand 10 illustrating the digital presenter 97 and the presentation device 12 (e.g., projector) mounted to a support assembly 30. In the embodiment shown, the support assembly 30 may have a pair of opposing side walls 44 interconnected by a back wall 28. At least one of the side walls 44 may include a handle 46 to facilitate maneuvering and lifting of the computer workstand 10. Optionally, one of the handles 46 may be replaced with an extension 118 which may serve as a mouse pad or as additional space for supporting document or other items. Although the support assembly 30 is shown as being generally rectangularly-shaped, the support assembly 30 may be of any shape, size, or configuration and which preferably is suitable for securing a device such as a laptop computer 48 to the support assembly 30. The support assembly 30 may comprise a part of a computer workstand 10 such as may be utilized in medical, educational and/or industrial settings.

Referring still to FIGS. 1-4, the support assembly 30 may generally have a bottom panel 50 which may be disposed atop a pedestal 42. The support assembly 30 may include a support panel 38 located on a top side of the support assembly 30. The support panel 38 may be slidably connected to the top of the support assembly 30 in that the support panel 38 may be configured to slide laterally forward and aft. The support panel 38 may include a plurality of slots and/or holes which are of predetermined spacing to allow one or more security devices 52 to be secured to the support panel 38 in a variety of locations. In this manner, a variety of sizes and configurations of laptop computers 48 or other devices may be secured to the support panel 38. The support panel 38 may have a support panel tab 36 that may align with a mating support assembly tab 34 located on the back wall 28 of the support assembly 30.

Ideally, once the support panel 38 is slid onto the support assembly 30, the tab 36 of the support panel 38 is sized and configured to pass through a slot on the back wall 28 of the support assembly 30 until the holes of both tabs 34, 36 are aligned. Once aligned, a locking mechanism 40 such as a padlock or combination lock or other locking device can be inserted through the axially-aligned holes. With the locking mechanism 40 inserted in the holes of the tabs 34, 36, the support panel 38 is secured in position relative to the support assembly to prevent access to a bottom surface 54 of the support panel 38 or to an inside of the support assembly 30. In this manner, removal of fasteners such as threaded nuts is limited due to inaccessibility to the inside of the support assembly 30.

In this manner, by preventing entry into the inside of the support assembly 30, theft of various electronic devices, mounting brackets and other components installed on the exterior surfaces of the support assembly 30 is prevented. For example, installation of the locking mechanism 40 through the holes in tabs 34, 36 and locking bracket 106 prevents removal of the digital presenter mount 98 and, hence, prevents removal of the digital presenter 97 as described in greater detail below.

Likewise, once the locking mechanism 40 is inserted through the holes in tabs 34, 36, removal of the support panel 38 is prevented which prevents access to the inside of the support assembly 30 to fasteners such as threaded nuts which are secure to studs or support tabs of the projector mount 11. As such, by preventing removal of the support panel 38, removal of the projector bracket 16 is prevented which prevents theft of the projector or other presentation device 12 mounted thereto. Even further, by preventing access to the bottom surface 54 of the support panel 38, removal of security devices 52 fastened thereto is also prevented. In this manner, theft of a laptop computer 48 or other device secured to the support assembly 30 is prevented.

Referring to 4, security devices 52 may secure the laptop computer 48 to the support panel 38. The security devices 52 may be similar to that which are disclosed in related U.S. Provisional Application No. 60/815,087, filed Jun. 20, 2006 and U.S. application Ser. No. 11/820,687 entitled LAPTOP SECURITY DEVICE FOR TECHNOLOGY WORKSTAND filed on Jun. 20, 2007, the entire contents of which is incorporated by reference. The security devices 52 may attach to the support panel 38 with mechanical fasteners 66 which are inserted from a bottom surface 54 of the support panel 38 and extended through holes formed in the support panel 38 and being threadably engaged to threaded holes formed in a bottom side of the security device 52.

The security devices 52 may be comprised of two elongated prongs 56 which may extend outwardly from a side 58 of the security device 52. The prongs 56 are preferably cylindrically-shaped, although other configurations are possible. The prongs 56 are also preferably tapered at one end. Ideally, the prongs 56 have a length ranging from about two inches to about four inches, with a preferred length of approximately two and one-half inches. In this manner, the security devices 52 secure the laptop computer 48 while in the open configuration (i.e., when the display monitor 60 is oriented in an outward position relative to the keyboard 62 of the laptop computer 48).

Referring to FIG. 1, the support assembly 30 may include a drawer 64 disposed below the support panel 38 and/or extendable outwardly therefrom. The drawer 64 is preferably mounted to slide into and out from the support assembly 30. In addition, the drawer 64 may be adapted to lock within the support assembly 30 to prevent access to the contents of the drawer 64 and to the bottom surface 54 of the support panel 38 from which the mechanical fasteners 66 for the security devices 52 are installed. Alternatively, a shelf (not shown) may be installed within the support assembly 30 to prevent access to the bottom surface 54 of the support panel 38 while providing computer basket for the user.

The support assembly 30 may also include a compartment 68 located below the drawer 64 to provide additional storage for various items. A plurality of vent holes 74 may be provided in a front end of the compartment 68. A keyboard tray (not shown) may also be slidably attached to the support assembly 30. An optional mouse tray (not shown) may laterally be slidable outward from the keyboard tray while the keyboard tray is extended from the support assembly 30.

Referring to FIGS. 1-4, the pedestal 42 may have a post 76 which preferably has a telescopic mechanism 78 with a height adjustment lever 80 to selectively adjust the height of the support assembly 30. The telescopic mechanism 78 may have a piston 82 which is axially reciprocative within a cylinder 84 which connects to a top of a base assembly 86. The base assembly 86 may include a plurality of radially outwardly extending spokes 88 which have a castor or wheel 90 mounted on a free end thereof. The castors 90 may optionally include a wheel lock 92 such that at least one and, more preferably, two or three of the castors 90 are lockable to prevent undesired movement of the computer workstand 10. In addition, an optional foot rest 94 may be mounted above the spokes 88 to provide a location to rest the user's foot. A storage basket 96 may be attached to the post 76 to provide additional storage such as to stow extension cords and other items.

Shown in FIGS. 1-3 and 9 is the digital presenter 97 which may be mounted to the computer workstand 10 and which may be used to capture images of documents arranged on the support panel 38. A digital presenter mount 98 facilitates the clamping of the digital presenter 97 to the support assembly 30 in a convenient and theft-resistant manner. In the embodiment shown, the digital presenter mount 98 is comprised of a horizontal plate 100 configured to mount to a vertical plate 102. The horizontal plate 100 supports the weight of the digital presenter 97. The horizontal plate 100 is preferably rectangularly-shaped although other shapes and sizes are contemplated.

Figure 9:
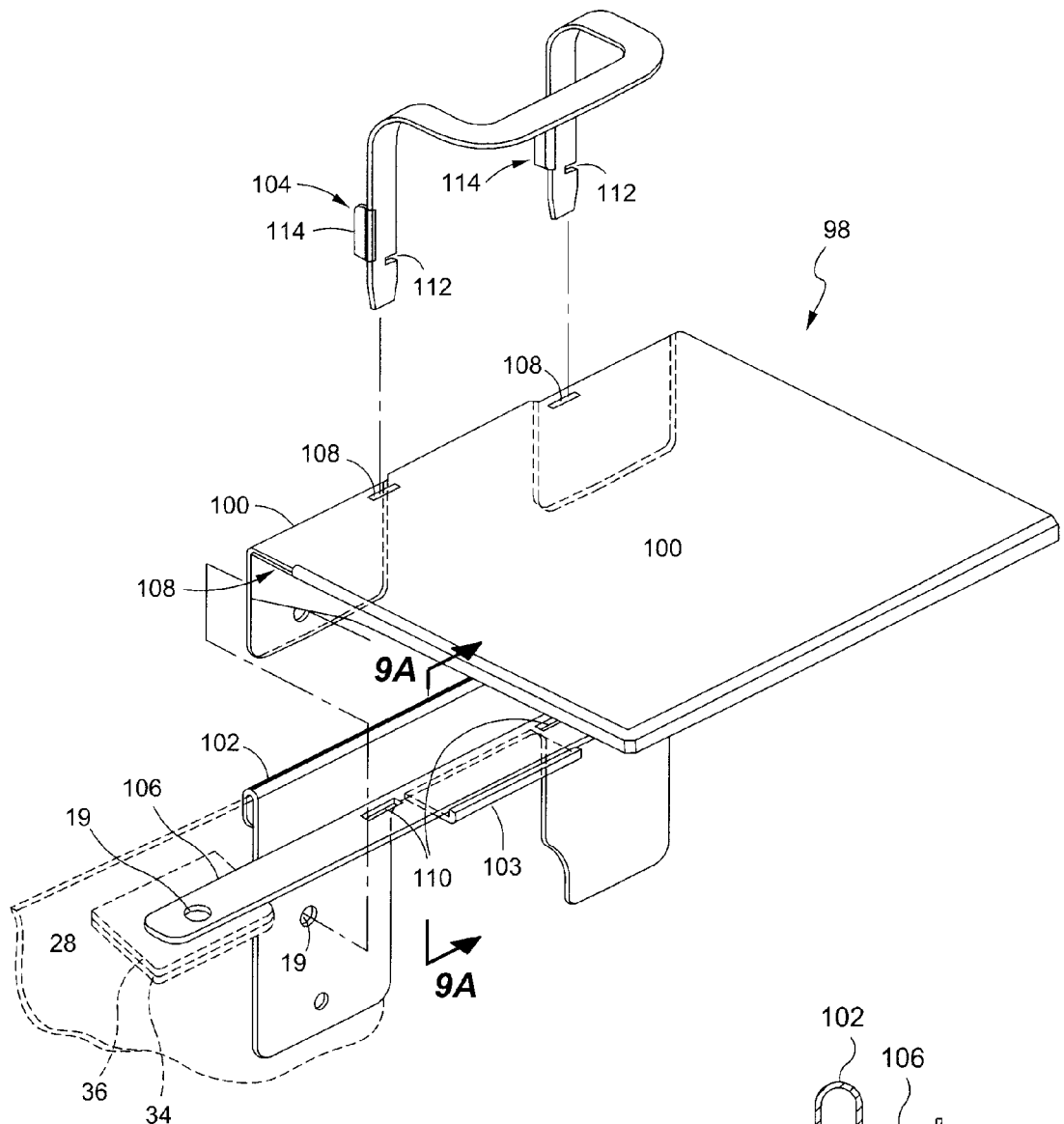
FIG. 9 is an exploded illustration of a digital presenter mount for securely mounting the digital presentation device.

Referring to FIG. 9, it can be seen that the horizontal plate 100 preferably includes a vertical section and downwardly-extending flanges having holes formed therein for alignment with holes formed in the vertical plate 102. The horizontal plate 100 also preferably includes at least two slots 108 formed in spaced arrangement on an upper surface and a slot 108 formed on a side surface of the horizontal plate 100. The pair of spaced slots 108 in the upper surface are preferably positioned at a predetermined spacing to accommodate the insertion of vertical legs of the security holder bracket 104 having a similar spacing. The vertical plate 102 is adapted to support the horizontal plate 100 by means of the vertical plate lip 103 which can be seen extending outwardly from the vertical plate 102 and upon which the locking bracket 106 rests.

Figure 9A:
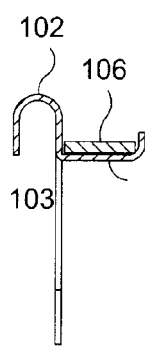
FIG. 9A is a cross sectional illustration of a locking bracket slidably disposed on a vertical plate lip of the digital presenter mount.

Referring to FIGS. 9 and 9A, when the digital presenter mount 98 is assembled, an underside of the horizontal plate 100 rests on the outwardly extending vertical plate lip 103 which may include an upturned flange on an outer edge of the vertical plate lip 103. The upturned flange supports that underside of the horizontal plate 100 such that the locking bracket 106 may slide freely between the underside of the horizontal plate 100 and the vertical plate lip 103. As can be seen in FIG. 9, the horizontal plate 100 includes the slot on the side surface. The slot is preferably formed in a size, shape and position that is complementary to the locking bracket 106 to allow the locking bracket 106 to slidably extend out of the slot 108 as shown in FIG. 2. The locking bracket 106 includes a hole 19 in one end thereof to prevent movement of the locking bracket 106 so that notches 112 formed in the security holder bracket 104 remain engaged to the slots 110 in the locking bracket 106. In this manner, the locking bracket 106 prevents theft of the digital presenter 97.

Mechanical fasteners 66 may be extended through the holes in the vertical plate 102 and the downwardly extending tabs of the horizontal plate 100 to connect the two components together with the locking bracket 106 captured therebetween. The mechanical fasteners 66 such as screws, bolts, or other threaded fasteners may also be extended through the back wall 28 to engage nuts, nutplates, and/or threaded inserts 67 mounted on an inside of the back wall 28. Because the interior of the support assembly 30 is only accessible by first removing the locking mechanism 40 shown in FIG. 9, removal of the mechanical fasteners 66 is prevented such that theft of the digital presenter 97 may be thwarted.

Referring to FIGS. 1-2, the security holder bracket 104 is preferably sized and configured complementary to the configuration of the digital presenter 97 to prevent removal thereof. More specifically, the security holder bracket 104 is preferably configured to encircle or wrap continuously around a portion of the digital presenter 97 such as around the upwardly-extending shaft of the digital presenter 97 shown in FIGS. 1-2. The security holder bracket 104 may include at least one outwardly extending tab 114 best seen in FIG. 9 and which limits the extent to which the vertical legs of the security holder bracket 104 are inserted through the slots 108, 110. By moving the locking bracket 106 laterally in this manner, the hole 19 in the locking bracket 106 may be axially aligned with the holes in the support panel tab 36 and the support assembly tab 34 such that the locking mechanism 40 may be inserted therethrough. In this manner, the locking mechanism 40 (e.g., pad lock, combination lock) may prevent lateral sliding movement of the locking bracket 106 which would otherwise cause the slots 110 to disengage from the notches 112 in the security holder bracket 104 and allow removal of the security holder bracket 104.

Figure 4:
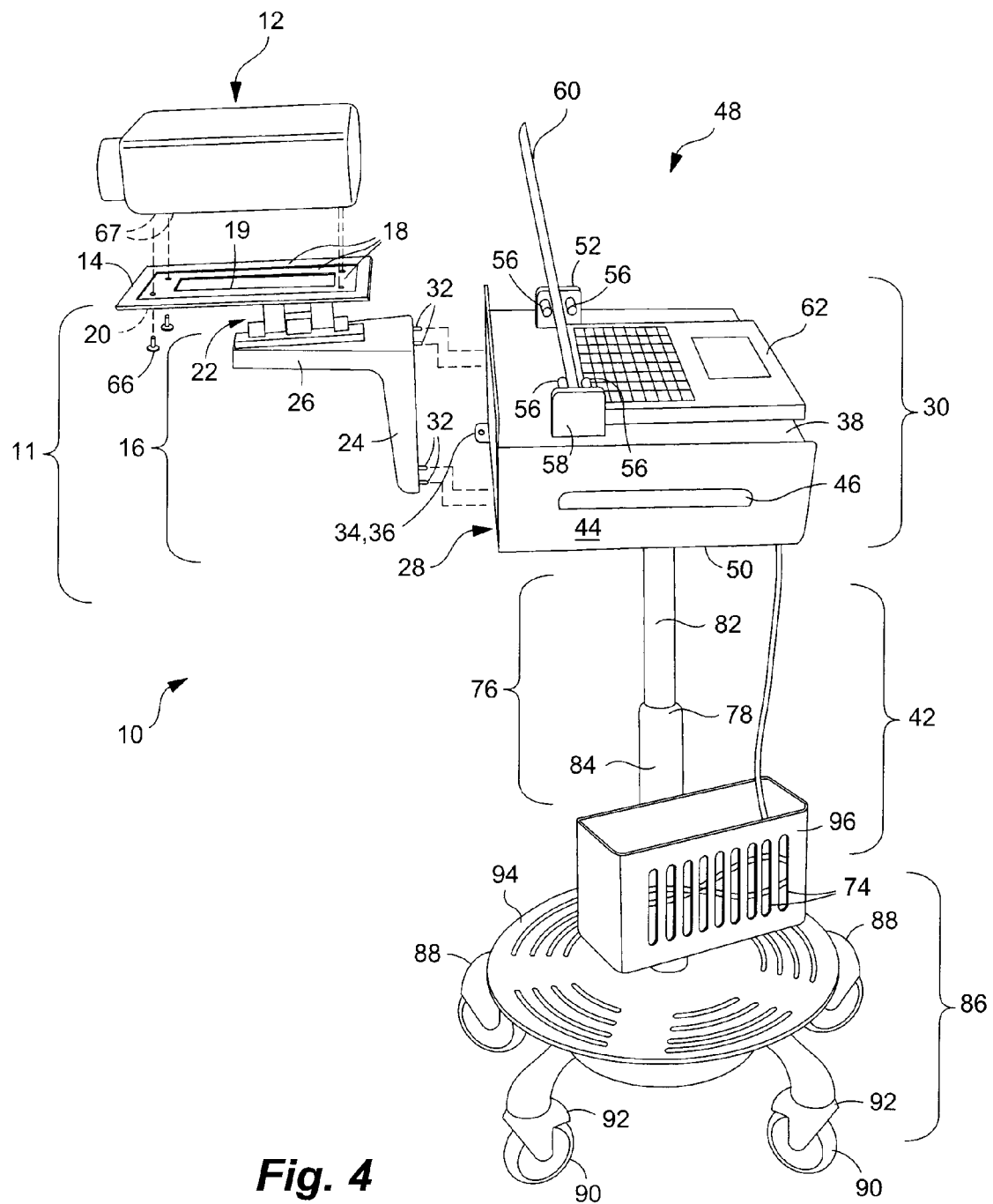
FIG. 4 is an exploded illustration of the projector mount and illustrating the interconnectivity of the projector mount to a back wall of the support assembly and a security plate for mounting the presentation device (i.e., projector) thereto.

Referring now to FIG. 4, shown is the digital presenter 97 which may be mounted to the support assembly 30 using a projector bracket 16 which may comprise a pair of side pieces 24 interconnected by a top piece 26. The spaced pair of side pieces may be oriented in perpendicular relationship to the top piece. The top piece 26 may be planar and may be mounted to the bottom 20 of the security plate 14 via a hinge 22. The side piece 24 is preferably configured to abut and mount to the back wall 28 of the support assembly 30. Support tabs 32 or threaded studs 32 may extend outwardly from the side piece 24. The support tabs 32 or threaded studs 32 may be inserted through preformed holes and/or slots in the back wall 28 of the support assembly 30 to mount the projector bracket 16. Optionally, threaded fasteners may be extended through axially-aligned holes in the projector bracket 16 and the back wall 28 to mount the projector bracket 16 on the support assembly 30.

Referring still to FIG. 4, digital projector or other digital presentation device 12 may be mounted in a manner to provide rotating or swiveling capability. In this regard, a hinge 22 may interconnect the digital projector or other digital presentation device 12 to the projector bracket 16. The hinge 22 may comprise several components including a first component mounted to the projector bracket 16. A second component may be hingedly mounted to the first component and may be configured to allow for pivoting motion of the digital projector up and down vertically or about an axis that is generally parallel to an upper surface of the projector bracket 16 and oriented perpendicularly relative to the back wall 28 of the support assembly 30.

A third component may be hingedly mounted to the second component to provide for pivoting motion of the digital projector horizontally or about an axis that is oriented transversely relative to the axis about which the second component rotates. By selectively moving these components, the hinge 22 may provide for vertical tilt and horizontal swivel of the security plate 14 and, hence, of the projector. In one embodiment, the hinge 22 preferably allows the security plate 14 to tilt vertically through an angular range of up to 180 degrees. Likewise, the hinge 22 may facilitate swiveling of the security plate 14 through an angular range of motion of up to about 180 degrees. As shown in FIG. 4, one or more hinges may be joined together to allow for both vertical and horizontal tilt and other rotational or swiveling motion of the security plate 14. Such tilt and swivel functions allow for optimal adjustment of the presentation device 12 to accommodate a variety of settings and presentation locations.

Figure 8:
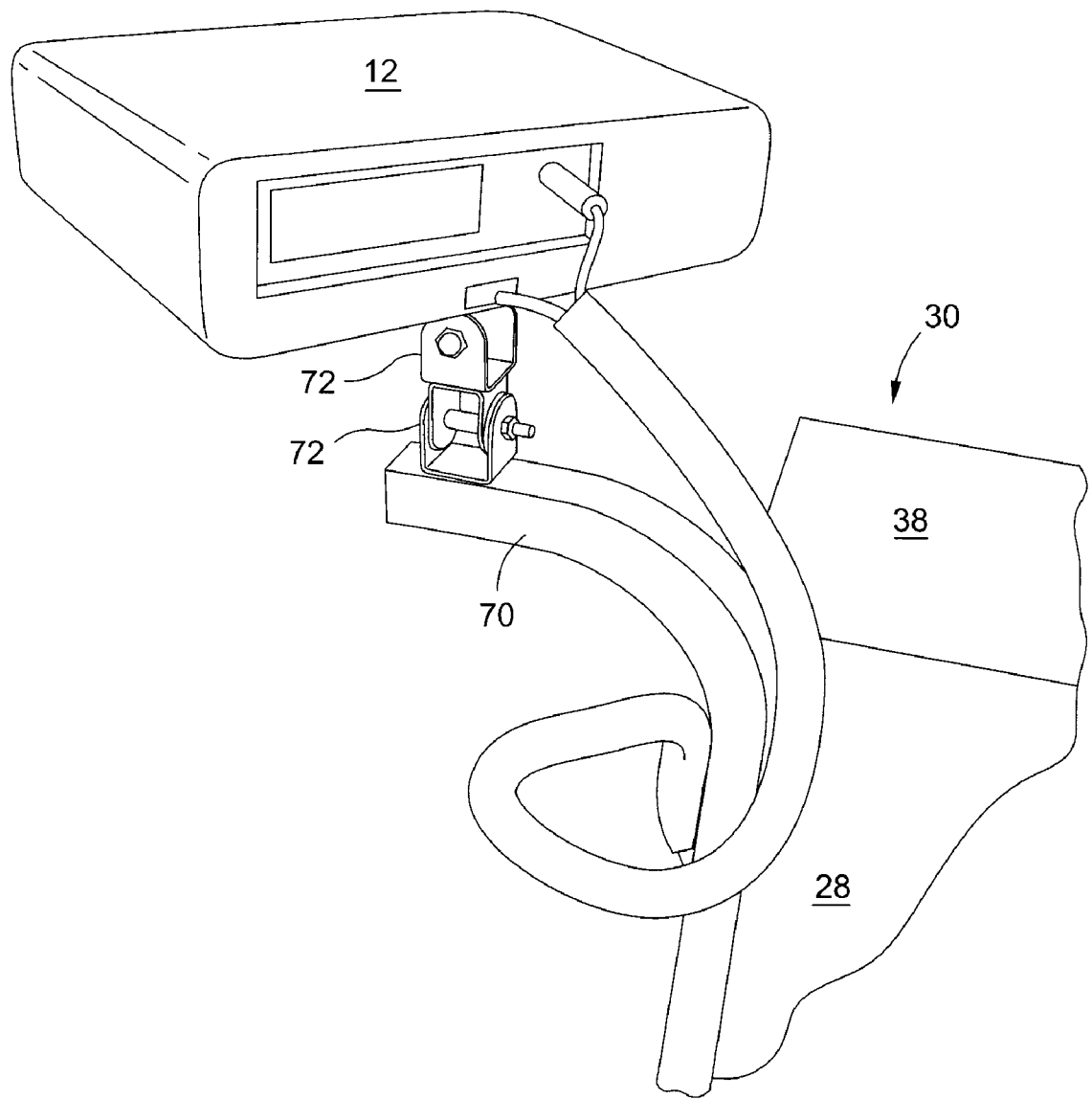
FIG. 8 is a perspective illustration of a bracket/hinge for swivelably mounting the presentation device.

Referring to FIG. 8, the computer workstand 10 may include the projector arm 70 to which the digital projector or other presentation device 12 may be mounted. The projector arm 70 may comprise a "J" shape as shown although other shapes are contemplated. The projector arm 70 may be mounted to the back wall 28 or side wall 44 of the support assembly 30 using threaded screws or fasteners 66 which pass through axially-aligned holes in both the projector arm 70 and the back wall 28. Optionally, threaded screws or fasteners 66 may be inserted through the support assembly 30 and threaded into the projector arm 70. In this manner, access to the screws or fasteners 66 may be prevented by limiting access to the interior of the support assembly 30. As can be seen in FIG. 8, the projector arm 70 may include a hinge 72 which may be configured to allow substantially universal range of motion to the digital projector or other device. The hinge 72 may be comprised of a pair of clevis fittings pivotally joined by fasteners oriented transversely relative to one another.

Figure 5:
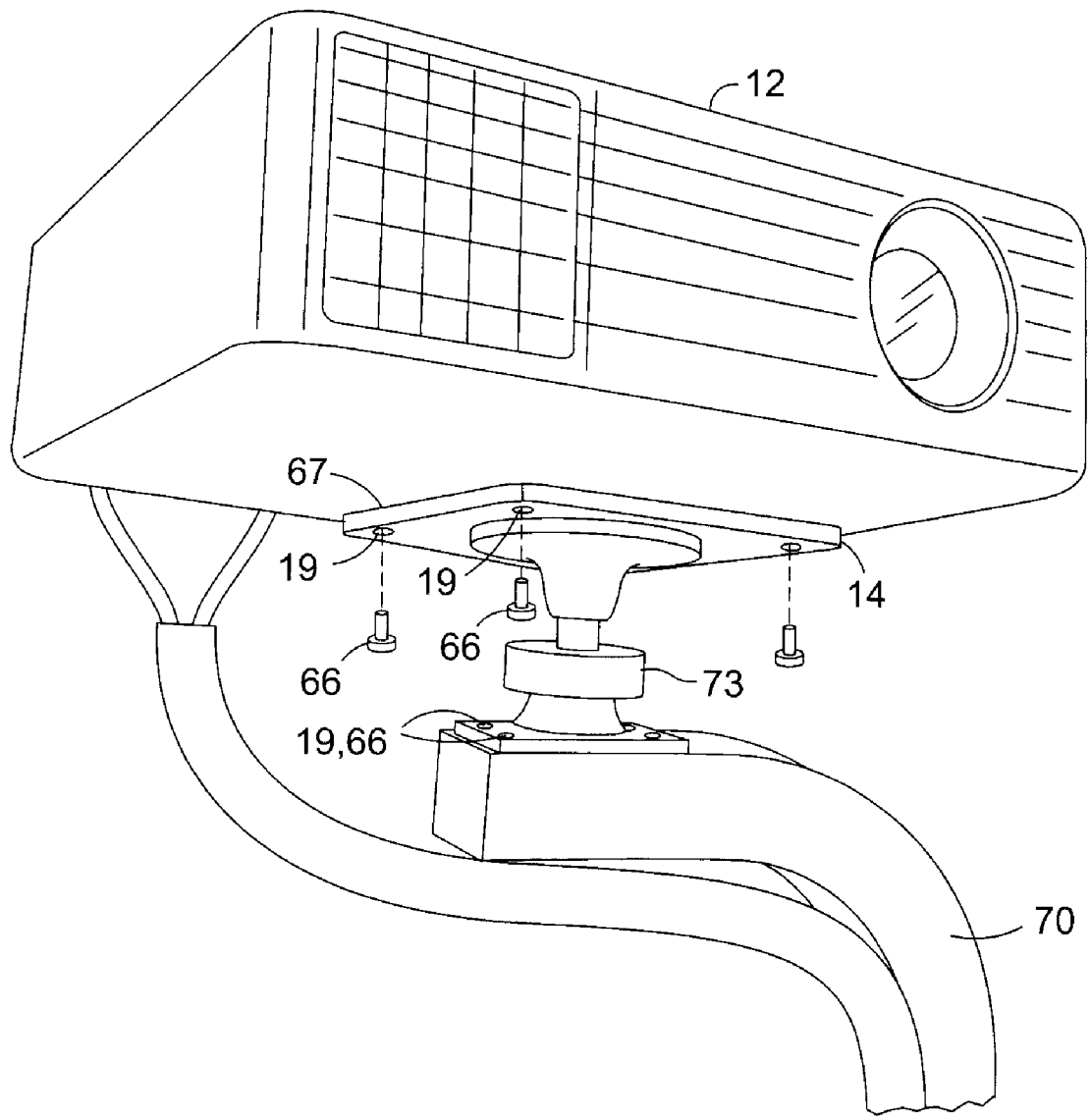
FIG. 5 is a perspective illustration of the presentation device mounted to the projector arm with a ball pivot.
Figure 6:
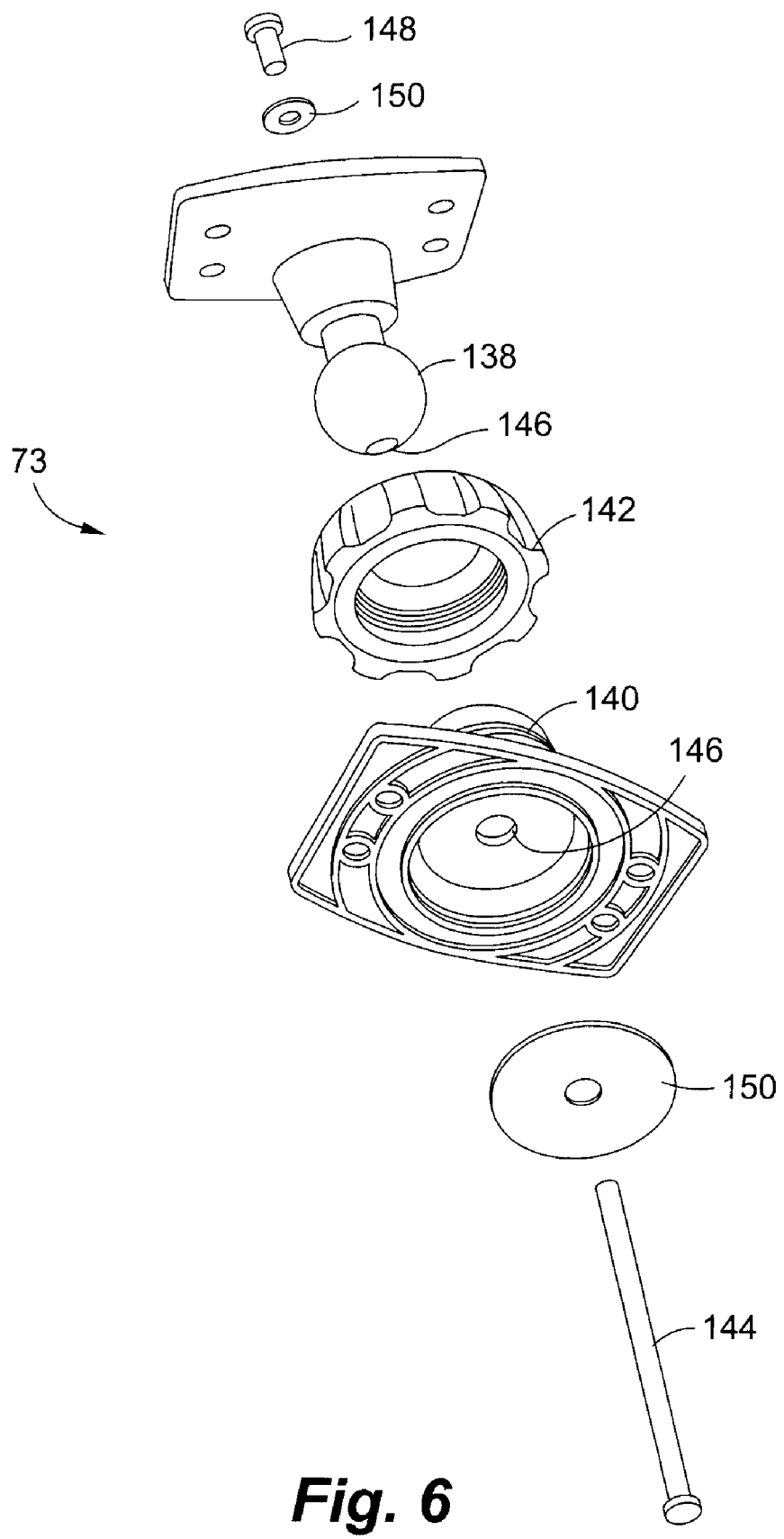
FIG. 6 is an exploded illustration of the ball pivot in one embodiment.

Other embodiments of the disclosure are also contemplated, including various combinations of the security plate 14 attached to either the projector bracket 16 or projector arm 70. For example, a ball pivot 73, as shown in FIGS. 1-2 and 6, may be substituted for hinge 22, 72 to allow both vertical and horizontal tilt, as well as swivel of the security plate 14 or digital projector or other presentation device 12. Alternatively, as shown in FIGS. 5 and 6, a ball pivot 73 may be provided to interconnect the presentation device 12 to the projector bracket 16 or to the projector arm 70.

The ball pivot 73 is specifically adapted to provide an essentially universal range of motion of the presentation device 12 relative to the projector bracket 16 or projector arm 70. As shown in FIG. 5, the ball pivot 73 may be mounted to the projector arm 70 or to the projector bracket 16 with mechanical fasteners 66 although other means such as adhesive bonding may be used to bond the ball pivot 73 to the projector arm 70. Likewise, the ball pivot 73 may be mounted to the presentation device 12 using mechanical fasteners 66 engaged to threaded inserts 67 provided with the presentation device 12. Alternative means such as adhesive bonding may also be used to attach the ball pivot 73 to the presentation device 12.

Referring to FIG. 6, shown is an exploded view of the ball pivot 73 illustrating the interconnectivity of a ball bracket 138, socket bracket 140, socket clamp 142 (e.g., threaded collar) and cable element 144 for securely assembling the ball pivot 73 together. More specifically, the cable element 144 is configured to extend through a length of the ball pivot 73 by passing the cable element 144 through apertures 146 formed in the ball bracket 138, socket bracket 140 and socket clamp 142 in order to prevent separation of the ball bracket 138 from the socket bracket 140 during use. Furthermore, because the cable element 144 is inaccessibly disposed on the inner sides of each of the ball bracket 138 and socket bracket 140, the ball pivot 73 securely locks the presentation device 12 to the projector arm 70 or projector bracket 16 as an anti-theft feature.

As can be seen in FIG. 6, washers 150 may be employed on the inner sides of the ball bracket 138 and socket bracket 140 to distribute axial loading in the cable element 144 and thereby prevent pull-through of the cable element 144 such as when an attempt is made to separate the ball bracket 138 from the socket bracket 140. A cable fitting 148 such as a threaded component (e.g., threaded nut) or a swage may be permanently formed on an end of the cable element 144 as shown in order to prevent unwanted separation of the ball bracket 138 from the socket bracket 140. Swivel adjustability of the ball pivot 73 may be provided by the socket clamp 142 shown in FIG. 6 as a threaded collar adapted to engage threads formed on the socket bracket 140. The socket clamp 142 provides a means to adjust the frictional resistance between the ball bracket 138 and the socket bracket 140 in order to maintain a desired orientation of the presentation device 12 relative to the projector arm 70 or projector bracket 16.

Referring to FIG. 4, the security plate 14 may be rectangularly-shaped although other shapes and sizes are contemplated. The security plate 14 may include a variety of preformed holes 19 and/or preformed slots 18 of various lengths and in various orientations in order to accommodate a wide range of hole patterns or insert patterns of digital projectors and other digital presentation devices that may be mounted to the security plate 14. The slots 18 are preferably oriented in a perpendicular or parallel relationship to each other. The slots 18 may be formed at a predetermined spacing to accommodate spacings of insert 67 patterns of known presentation devices 12.

The slots 18 in the security plate 14 are optionally between one-eighth inch and one-half inch in width and spaced apart at between one-half inch and two inches. However, the slots 18 may be provided in any width and at any spacing and in any orientation. To secure the presentation device 12 to the security plate 14, security screws or mechanical fasteners 66 may be extended through a bottom 20 of the security plate 14 and threaded into inserts 67 of the presentation device 12. In this manner, a user may securely mount the presentation device 12 to the security plate 14.

Figure 7:
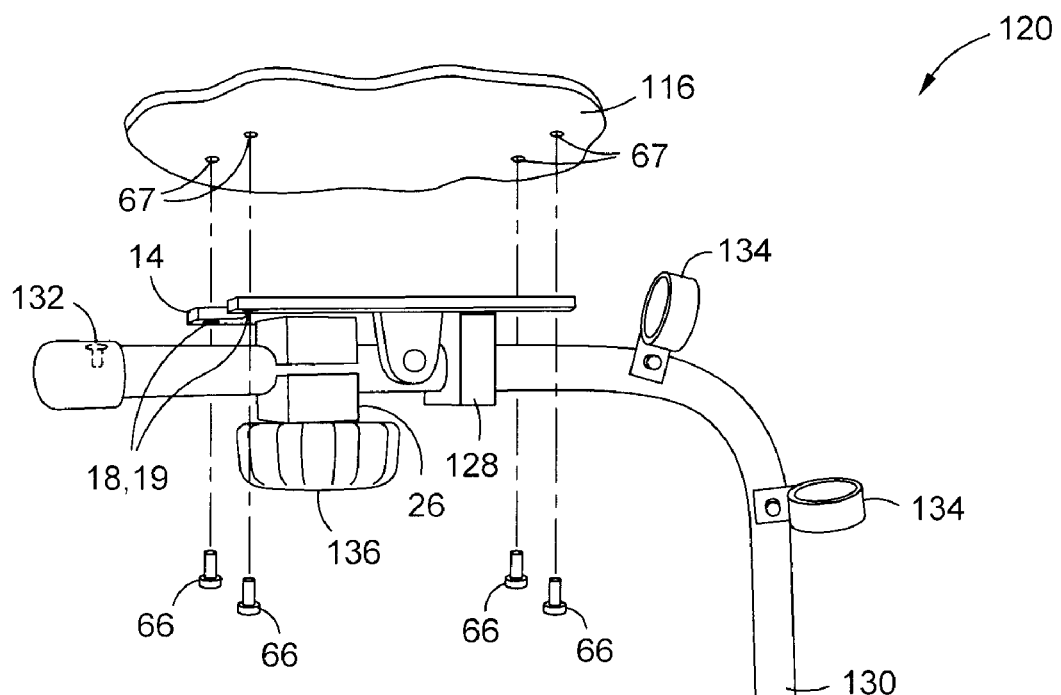
FIG. 7 is a perspective illustration of the modular arm assembly to which the pen tablet may be mounted.

Referring to FIGS. 3 and 7, shown is a modular arm assembly 120 as may be used to mount a pen tablet 116 or other presentation device 12 to the support assembly 30. The modular arm assembly 120 may be comprised of an arm member 130 which is shown as having an "L" shape although any shape may be provided. The arm member 130 may be a tubular or rod-like construction of any cross-sectional shape including the circular cross section shape shown in FIGS. 3 and 7. A lower pivot bracket 124 and lower clamp bracket 122 may be mounted on the end of the arm member 130. The lower pivot bracket 124 may be mounted at a lower level on the arm member 130 than the lower clamp bracket 122 although other arrangements are contemplated.

As shown in FIG. 7, the lower pivot bracket 124 may be sized and configured to allow rotation of the arm member 130 relative to a bore in the lower pivot bracket 124 and through which the arm member 130 extends. One or more mechanical fasteners 66 may be extended into threaded inserts 67 in the lower pivot bracket 124 to facilitate mounting of the lower pivot bracket 124 to the side wall or back wall 28 of the support assembly 30. Likewise, one or more mechanical fasteners 66 may be extended into threaded inserts 67 in the lower clamp bracket 122 to facilitate mounting of the lower clamp bracket 122 to the support assembly 30. The mechanical fasteners 66 may be installed form an interior of the support assembly 30 such that when the support assembly 30 is locked, theft of the modular arm member 130 and mounted presentation device 12 is prevented. The lower clamp bracket 122 may include a slot formed therein and may have a manually rotatable clamp knob 136 that facilitates clamping of the lower clamp bracket 122 to the arm member 130 in order to clamp the lower pivot bracket 124 and prevent rotation of the arm member 130.

Figure 7A:
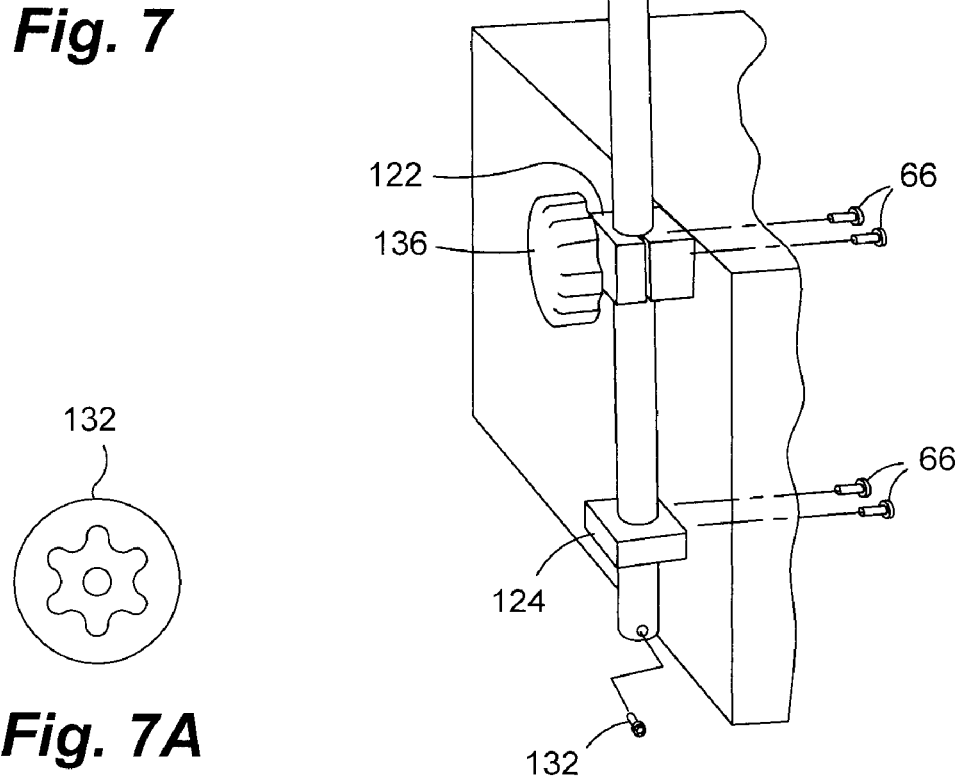
FIG. 7A is an enlarged view of a security screw as may be mounted in opposing ends of the modular arm assembly.

Referring still to FIGS. 7 and 7A, a lower end of the arm member 130 may include a security screw 132 which may include an engagement feature such as a pin-socket or pin Allen drive that prevents removal of the security screw 132 absent the corresponding tools. In this regard, the security screw 132 is preferably configured such that simple tools cannot be used to remove the security screw 132. An upper end of the arm member 130 may also be provided with the security screw 132 to prevent easy removal thereof which preferably reduces the risk of theft of the presentation device 12 that may be mounted on the modular arm assembly 120.

The upper end of the arm member 130 may be provided with an upper pivot bracket 128 and upper clamp bracket 126 which may be each mounted to a security plate 14 which, in turn, may be used to mount the presentation device 12. The upper pivot bracket 128 and upper clamp bracket 126 may be configured similar to the arrangement of the lower pivot bracket 124 and lower clamp bracket 122. Operation of the upper pivot bracket 128 and upper clamp bracket 126 is similar to that described above wherein the manually rotatable clamp knob 136 facilitates clamping of the lower clamp bracket 122 to the arm member 130 in order to clamp the upper pivot bracket 128 in a desired position relative to the arm member 130 after the presentation device 12 is positioned in a desired orientation. Cable clamps 134 may optionally be included with the modular arm assembly 120 to route cables and wiring along the arm member 130.

The above description is given by way of example, and not limitation. Given the above disclosure, one skilled in the art could devise variations that are within the scope and spirit of the invention disclosed herein, including various ways of shaping the projector arm 70 or mounting the projector mount 11 to the support assembly 30 or the presentation device 12 to the security plate 14. In addition, one could devise various ways to Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A projector mount for securing a presentation device to a support assembly having an interior, the projector mount comprising:
a projector bracket having a plurality of support tabs extending outwardly therefrom, the support tabs being adapted to be inserted through preformed holes in the support assembly and into the interior; and
a hinge interconnecting the presentation device to the projector bracket, the hinge being configured to allow a security plate to pivot in at least one of vertical and horizontal directions;
wherein:
the support assembly includes a support panel, a bottom panel, and a pair of opposing side walls interconnected by a back wall; and
the support panel being lockable to the back wall to prevent access to the support tabs in the interior of the support assembly such that removal of the projector bracket is prevented.

2. The projector mount of claim 1 wherein:
the security plate has preformed slots configured for mounting the presentation device thereto.

3. The projector mount of claim 1 wherein the projector bracket is configured as a projector arm having a J-shape and being mountable to the support assembly.

4. The projector mount of claim 1 wherein the support tabs are configured as threaded studs.

5. The projector mount of claim 1 wherein:
the hinge is configured as a ball pivot having a ball bracket and socket bracket non-removably engaged to one another.

6. The projector mount of claim 5 further comprising:
a cable element;
wherein:
the ball bracket is mountable to one of the presentation device and the projector bracket;
the socket bracket being rotatably engageable to the ball bracket, the socket bracket being mountable to one of the presentation device and the projector bracket;
the cable element is extendable through the ball bracket and socket bracket and having a cable fitting disposable on an end of the cable element to prevent separation of the ball bracket from the socket bracket such that removal of the presentation device is prevented.

7. The projector mount of claim 6 wherein:
the cable element is configured as at least one of the following: a threaded nut threadably engaged to an end of the cable element, a swage permanently formed on the end of the cable element.

8. A digital presenter mount for securing a digital presenter to a support assembly, the digital presenter mount comprising:
a horizontal plate comprising a vertical section and a horizontal section and having at least two slots;
a vertical plate having an outwardly extending vertical plate lip and being attached to the vertical section with mechanical fasteners;
a security holder bracket sized and configured to wrap around a portion of the digital presenter, the security holder bracket having a pair of vertical legs, each leg having a notch and being insertable through the slots in the horizontal plate; and
a locking bracket having at least two slots formed at a spacing complementary to the spacing between the slots in the horizontal plate, the locking bracket including a hole at an end thereof and being slidably supported on the vertical plate lip and being disposed under the horizontal plate;
wherein:
the locking bracket is laterally slidable such that the slots of the locking bracket engage the notches of the security holder bracket to prevent removal of the security holder bracket.

9. The digital presenter mount of claim 8 wherein:
the locking bracket is lockable to the support assembly to prevent lateral movement of the locking bracket.

10. The digital presenter mount of claim 9 wherein:
the support assembly includes a back wall having a support assembly tab extending outwardly therefrom;
the locking bracket being lockable to the support assembly tab such that lateral movement of the security holder bracket is prevented.

11. The digital presenter mount of claim 10 wherein:
the back wall includes a support assembly tab extending laterally outwardly therefrom and being formed complementary to the support panel tab;
each one of the support panel tab and support assembly tab having holes positioned to be axially alignable with one another;
the hole in the locking bracket being configured to be aligned with the holes in the support panel tab and the support assembly tab when the slots in the locking bracket engage the notches such that a locking mechanism may be inserted through the holes in the support panel tab, support assembly tab and locking bracket.

12. The digital presenter mount of claim 11 wherein:
the locking mechanism is configured as at least one of a padlock and a combination lock.

13. The digital presenter mount of claim 11 further comprising:
a pair of security devices being mountable to the support panel for securing a computer laptop thereto.

14. A modular arm assembly for securing a presentation device to a support assembly having an interior, the modular arm assembly comprising:
an arm member having opposing ends;
a lower pivot bracket and a lower clamp bracket being mounted on one end of the arm member, the lower pivot bracket and lower clamp bracket being mountable to the support assembly with mechanical fasteners installed from the interior of the support assembly; and
an upper pivot bracket and upper clamp bracket being mountable on an end of the arm member opposite the lower pivot bracket and lower clamp bracket;
wherein:
the support assembly being configured to prevent access to the interior such that removal of the mechanical fasteners is prevented;
the lower pivot bracket being configured to facilitate free rotation of the arm member; and
the lower clamp bracket having a clamp knob mounted thereto and being configured to clamp the arm member against rotation relative to the lower clamp bracket.

15. The modular arm assembly of claim 14 further comprising:
a security screw disposed on each of the ends of the arm member and being configured to prevent removal of the upper and lower pivot brackets and upper and lower clamp brackets.

16. The modular arm assembly of claim 14 wherein:
the presentation device is configured as a pen tablet.

17. A support assembly adapted for mounting at least one presentation device thereto and having an interior configured to prevent access thereto, the support assembly comprising:
a digital presenter mount for securing a digital presenter to the support assembly, the digital presenter mount including:
a horizontal plate comprising a vertical section and a horizontal section and having at least two slots;
a vertical plate having an outwardly extending vertical plate lip and being attached to the vertical section with mechanical fasteners;
a security holder bracket sized and configured to wrap around a portion of the digital presenter, the security holder bracket having a pair of vertical legs, each leg having a notch and being insertable through the slots in the horizontal plate; and
a locking bracket having at least two slots formed at a spacing complementary to the spacing between the slots in the horizontal plate, the locking bracket including a hole at an end thereof and being slidably supported on the vertical plate lip and being disposed under the horizontal plate, the locking bracket is laterally slidable such that the slots of the locking bracket engage the notches of the security holder bracket to prevent removal of the security holder bracket;
a modular arm assembly for securing the presentation device to the support assembly, the modular arm assembly including:
an arm member having opposing ends;
a lower pivot bracket and a lower clamp bracket being mounted on one end of the arm member, the lower pivot bracket and lower clamp bracket being mountable to the support assembly with mechanical fasteners installed from the interior of the support assembly such that removal of the mechanical fasteners is prevented; and
an upper pivot bracket and upper clamp bracket being mountable on an end of the arm member opposite the lower pivot bracket and lower clamp bracket; and
a projector mount for securing the presentation device to the support assembly, the projector mount including:
a projector bracket having a plurality of threaded studs extending outwardly therefrom, the threaded studs being adapted to be inserted through preformed holes in the support assembly such that the threaded studs extend into the interior, the support assembly being configured to prevent access to the support tabs in the interior of the support assembly such that removal of the projector bracket is prevented; and
a hinge interconnecting the presentation device to the projector bracket, the hinge being configured to allow the security plate to pivot in at least one of vertical and horizontal directions.

18. The support assembly of claim 17 wherein:
the locking bracket is lockable to the support assembly to prevent lateral movement of the locking bracket.

\* \* \* \* \*